106. COMPOSITIONS, COATING OR PLASTIC

Patented Apr. 30, 1940

2,198,776

UNITED STATES PATENT OFFICE 2,198,776

WATER-RESISTANT CEMENTITIOUS PRODUCT

George D. King, Chicago, and Thomas P. Camp, Glen Ellyn, Ill., assignors to United States Gypsum Company, Chicago, Ill., a corporation of Illinois No Drawing. Application August 29, 1936, Serial No. 98,576

12 Claims. (Cl. 154—)

The present invention relates to a water-resistant cementitious product, comprising a set mass of interlaced cement crystals and a fusible, water-insoluble coating over the crystals so as to prevent attack thereon by solvent liquids such as water and the like.

One of the objects of the invention is to produce a set cementitious mass which has been made water resistant by the incorporation therein during its manufacture, and while still in the slurry state, of a fusible organic waterproofing material, which latter is subsequently caused to adhere to the crystals of the set cement by the expedient of heating the cementitious product to a temperature sufficiently high to cause the melting or fusing of the organic substance, whereby the same distributes itself over the fibers or crystals of the cementitious mass.

A further object of the invention is to produce water-resistant cementitious boards provided with paper liners, in which the cementitious core and also, if desired, the inner portions of the paper liners have been rendered water resistant by means of a waxing material in the manner hereinbelow described.

Further objects of the invention will become evident from the detailed description of the present specification and the thereto appended claims.

The invention also relates to a process of waterproofing gypsum boards and other gypsum products. Frequently water impairs the physical and chemical stability of building materials. For instance, gypsum products, such as wallboard, tile, etc., when moistened with water will lose considerable strength and heat-insulating value.

A great number of attempts have been made to render materials more water resistant. Some attempt to obtain it by a protective coating of a waterproofing material like varnish, paint, and a number of others. However, it is difficult and expensive to obtain a protective coating that has sufficient stamina to withstand water either in its liquid or vapor phase. In addition, the slightest break or flaw in the protective film allows water to enter and permits the damage to proceed unseen and undetected until after it is too late.

A more difficult, and somewhat better, way is to waterproof material integrally by the addition of water-repellent substances compatible with the physical and chemical properties of the treated material. It is generally customary to add waterproofing materials in the form of an emulsion or solution, if they are of an oily, waxy or a fatty nature. Even such substances as asphalt, and others of a solid or semi-solid nature, can be conveniently added in this manner. However, if an emulsion is used, it is necessary to break it irreversibly, otherwise there will be a tendency to reemulsify the waterproofing agents and thereby remove them from the material. This is often rather difficult to accomplish, and uniform results are not always obtained.

Some attempt to obtain a more uniform distribution by spraying a solution containing the waterproofing substances in a suitable solvent. However, all of these methods seriously impair the physical and chemical properties of the final product, due to interference with the crystallization process, and the bonding of the liners to the core.

We have found, contrary to general belief, that paraffin or its equivalent, either natural or synthetic, such as tallow, beeswax, hydrogenated cocoanut oil, etc., when added in a solid, but finely comminuted form, and in accordance with this invention, will render the cementitious product water resistant. While not as satisfactory, we have been able to use asphalt or a mix of asphalt and paraffin. We prefer to use paraffin, since it readily melts and resolidifies, and readily penetrates the core on remelting in the board-drying kiln. We prefer to melt the paraffin or its equivalent, and spray the same as a fine mist into the cementitious mass used in forming the core. The fine particles are solidified on coming into contact with the cement and water mass.

There are other ways that paraffin or its equivalent may be added. For instance, it can be incorporated by powdering and adding to the cement core mix. In addition, a carrier, such as finely divided sand, gypsum, fiber, etc., can be mixed with melted paraffin, the mix solidified and powdered, and the treated carrier dispersed throughout the cementitious composition.

In practicing our invention, for instance in the manufacture of gypsum wallboard, we will describe the essential steps. However, it is not our intention to limit this invention to this particular product or this particular procedure, for obviously the proportions of various ingredients and the steps of the improved process may be varied considerably without departing from the spirit of this invention.

Gypsum wallboard is made by depositing a plastic gypsum mass between fibrous liners, pressing to a desired thickness the liners and the mass through rollers and allowing it to set and harden before cutting and passage through the dryer to remove excess moisture. The plastic mass is made by intimately mixing water, calcined gypsum, and other modifying ingredients in a mixer or mixers. In practicing our invention, we prefer to add the paraffin or its equivalent either in a very finely powdered form either previously prepared or prepared by spraying the molten paraffin or its equivalent as a very fine mist or stream into the mixture as it is blended in the mixer. As the paraffin mist cools, it forms very tiny droplets, or globules, which become intimately mixed with the plastic mix.

However, the mere addition of paraffin or its equivalent in a very fine mist-like form does not in and of itself result in total waterproofness. Though by this step we do obtain some beneficial results, we rely more on the action due to subsequent drying of the plastic mass than on its addition. We do not know definitely what takes place during the drying process, but it is believed that the finely divided mist of paraffin, as it drops upon the plastic mass in the mixer, is dispersed uniformly throughout the mass. When this mass hardens and sets, it is believed that the tiny spheres of paraffin are distinct and separate. But, when the set mass is dried to remove the excess water, the paraffin, the melting point of which is considerably lower than that of the board or other shape, will melt and form a tiny globule of molten paraffin within the mass. As the water recedes, and is removed, the globule of molten paraffin will spread in all directions partly because of the absence of the restraint by the water, and partly by the forces of capillarity. There is also some evidence that the freshly dried and hot material is more easily susceptible to wetting by the molten paraffin, which coats it with a very thin waterproof film.

It is believed that the principal cause for loss of strength of gypsum and fibrous products when waterproofed integrally is that the waterproofing solution or emulsion coats the crystals of plaster of Paris before they have on opportunity to hydrate and enmesh and intertwine each other. In our process, the crystals of set plaster are given full opportunity to develop their maximum strength, and the tiny droplets of paraffin present before the drying are present therein only as an aggregate, without any particular effect upon the strength. However, when they are melted by the heat applied during the drying process, they are absorbed upon the surface of the fibers or crystals or their aggregates, and do not affect the forces which impart the strength to the product. Likewise, the solution or emulsion interferes with bond of core to paper liners by preventing free crystallization of the hydrating plaster of Paris into the crevices and interstices of the paper.

In practicing this invention, we prefer to use a paraffin or equivalent melting at about 122 degrees Fahrenheit, but paraffin or equivalent of other melting points can be used, provided they have a melting point below the drying temperature of the board or other product and do not distill off at the drying temperature of the treated material. A sharp definite melting point is preferable to a gradual softening character. We have used as little as one-half of one per cent and as high as fifteen per cent of paraffin by weight of the core; we have found that the addition of more than five per cent will have a slight tendency to impair the strength. For the purpose of gypsum wall-board one and one-half to three per cent is generally sufficient. In the case of three-eighths inch board, this will vary from ten to fifty pounds of paraffin wax per thousand square feet of board, according to the weight of the board.

This invention may be used with other cements than gypsum, such as Portland cement, oxychlorides, etc. For instance, steam-curing of Portland cement products may be used to melt the waterproofer.

Various modifications may of course be made in using other waterproofing materials than paraffin, or a variation may be made in this process without departing from the spirit of this invention.

We claim:

1. A water-resistant cementitious product comprising a set mass of interlaced cement crystals and a waxy coating on the crystals.

2. A water-resistant cementitious product comprising a set mass of interlaced gypsum crystals and a waxy water-insoluble coating on the crystals.

3. A water-resistant gypsum board product comprising paper liners and a set gypsum core therebetween, the crystals of gypsum in the core being coated with a wax-like substance.

4. A water-resistant gypsum board product comprising paper liners and a set gypsum core therebetween, the crystals as well as the interior portions of the fibers of the paper liners being rendered water-repellent by a coating of a fusible organic wax-like substance.

5. A water-resistant gypsum board product comprising paper liners and a set gypsum core therebetween, the crystals as well as the interior portions of the fibers of the paper liners being rendered water-repellent by a coating of paraffin wax.

6. The process of producing a water-resistant cement body which comprises adding a finely divided readily fusible waxy substance to a slurry of water and a cementitious material, shaping the slurry to form an object therefrom and allowing the body to harden or set, and then heating the body to a temperature sufficiently high to substantially remove the free water therefrom and to fuse the waxy substance so that it will flow around and coat the crystals of cement therein.

7. The process of producing a water-resistant board having a gypsum core which comprises forming a slurry of calcined gypsum and water, adding thereto a finely divided wax-like substance and thoroughly mixing the same therewith, placing the mixture between paper liners to form a board, and heating the board, after the gypsum therein has set, to a temperature sufficiently high to fuse the wax-like substance and to cause it to coat the gypsum crystals and, by migration of a portion thereof to the interface between the paper and the core, also to coat at least the interior fibers of the paper.

8. The process as claimed in claim 7, wherein the wax-like substance is paraffin wax.

9. The process of producing a water-resistant paper-covered gypsum board which comprises spraying molten paraffin wax into a slurry of calcined gypsum and water, continuously placing the resulting mixture between two advancing webs of paper, pressing the thus formed board into shape and permitting the calcined gypsum therein to hydrate and set, and then subjecting the board to a temperature sufficiently high to fuse the wax and thereby to cause it to coat the gypsum crystals in the board and the inside of the paper.

10. The process of producing a water-resistant paper-covered gypsum board which comprises spraying a fine mist of melted paraffin wax into a calcined gypsum slurry, placing the slurry between paper liners and permitting it to set therebetween to form a gypsum core, and heating the board to melt the paraffin globules therein so as to cause them to coat the gypsum crystals.

11. A water-resistant gypsum board having paper liners and a gypsum core in which the crystals of gypsum are coated with paraffin wax, the amount of the latter present in the board being in the proportion of not exceeding 50 pounds of wax per 1000 square feet of ⅜" thick board.

12. A water-resistant gypsum product comprising interlaced set gypsum crystals coated with paraffin wax.

GEORGE D. KING.
THOMAS P. CAMP.